United States Patent
Kim et al.

(10) Patent No.: US 12,441,830 B2
(45) Date of Patent: Oct. 14, 2025

(54) METHOD FOR PREPARING POLYOLEFIN-POLYSTYRENE-BASED MULTIBLOCK COPOLYMER

(71) Applicant: LG Chem, Ltd., Seoul (KR)

(72) Inventors: Yun Kon Kim, Daejeon (KR); Seul Ki Im, Daejeon (KR); Hyun Mo Lee, Daejeon (KR); Ji Hyun Park, Daejeon (KR); Dong Min Kim, Daejeon (KR); Mi Kyung Kim, Daejeon (KR); Ki Soo Lee, Daejeon (KR); Eun Ji Shin, Daejeon (KR); Seok Pil Sa, Daejeon (KR); Seung Jung Yu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 474 days.

(21) Appl. No.: 18/022,818

(22) PCT Filed: Aug. 25, 2021

(86) PCT No.: PCT/KR2021/011377
§ 371 (c)(1),
(2) Date: Feb. 23, 2023

(87) PCT Pub. No.: WO2022/045770
PCT Pub. Date: Mar. 3, 2022

(65) Prior Publication Data
US 2023/0303753 A1 Sep. 28, 2023

(30) Foreign Application Priority Data

Aug. 28, 2020 (KR) .................. 10-2020-0109159
Aug. 24, 2021 (KR) .................. 10-2021-0111575

(51) Int. Cl.
*C08F 297/08* (2006.01)
*C08F 210/16* (2006.01)
*C08F 295/00* (2006.01)

(52) U.S. Cl.
CPC ........ *C08F 297/086* (2013.01); *C08F 210/16* (2013.01); *C08F 295/00* (2013.01); *C08F 2410/01* (2013.01)

(58) Field of Classification Search
CPC .................................................. C08F 212/08
See application file for complete search history.

(56) References Cited

U.S. PATENT DOCUMENTS

| | | |
|---|---|---|
| 6,838,409 B1 | 1/2005 | Yabunouchi et al. |
| 2006/0128910 A1 | 6/2006 | Blann et al. |
| 2006/0173226 A1 | 8/2006 | Blann et al. |
| 2006/0211903 A1 | 9/2006 | Blann et al. |
| 2006/0229480 A1 | 10/2006 | Blann et al. |
| 2008/0269412 A1 | 10/2008 | Carnahan et al. |
| 2018/0022852 A1 | 1/2018 | Lee et al. |
| 2018/0273669 A1 | 9/2018 | Arai |
| 2020/0031978 A1* | 1/2020 | Lee .............. C08F 12/08 |
| 2021/0002303 A1 | 1/2021 | Sa et al. |
| 2021/0002473 A1 | 1/2021 | Lee et al. |
| 2021/0017377 A1 | 1/2021 | Shin et al. |
| 2021/0108066 A1 | 4/2021 | Hong et al. |

FOREIGN PATENT DOCUMENTS

| | | | |
|---|---|---|---|
| CN | 110475795 A | 11/2019 | |
| EP | 3590983 A1 | 1/2020 | |
| EP | 3590983 B1 * | 6/2023 | ............ C08F 297/02 |
| KR | 20010102335 A | 11/2001 | |
| KR | 20030005691 A | 1/2003 | |
| KR | 20140043507 A | 4/2014 | |
| KR | 20160098968 A | 8/2016 | |
| KR | 101657925 B1 | 9/2016 | |
| KR | 101732418 B1 | 5/2017 | |
| KR | 101829382 B1 * | 2/2018 | ............ C08F 297/06 |
| KR | 20180061227 A | 6/2018 | |
| KR | 20190114715 A | 10/2019 | |

OTHER PUBLICATIONS

KR101829382 English machine translation, prepared Aug. 4, 2025. (Year: 2025).*
Kim, D. H. et al., "Preparation of polystyrene-polyolefin multiblock copolymers by sequential coordination and anionic polymerization" Royal Society of Chemistry, CrossMark, Jan. 2017, pp. 5948-5956, vol. 7, No. 10.
Extended European Search Report including Written Opinion for Application No. 21862067.2 dated Dec. 22, 23, pp. 1-6.
International Search Report for Application No. PCT/KR2021/011377 mailed Dec. 14, 2021, pp. 1-4.

* cited by examiner

*Primary Examiner* — Christopher M Rodd
(74) *Attorney, Agent, or Firm* — Lerner David LLP

(57) ABSTRACT

The present invention relates to a method for preparing a polyolefin-polystyrene-based multiblock copolymer having a uniform structure and showing excellent physical properties through continuous type coordination polymerization and batch type anionic polymerization.

13 Claims, 3 Drawing Sheets

METHOD FOR PREPARING POLYOLEFIN-POLYSTYRENE-BASED MULTIBLOCK COPOLYMER

CROSS-REFERENCE TO RELATED APPLICATIONS

The present application is a national stage entry under 35 U.S.C. § 371 of International Application No. PCT/KR2021/011377 filed on Aug. 25, 2021, which claims priority from Korean Patent Application Nos. 10-2020-0109159 filed on Aug. 28, 2020, and 10-2021-0111575 filed on Aug. 24, 2021, all the disclosures of which are incorporated herein by reference.

TECHNICAL FIELD

The present invention relates to a method for preparing a polyolefin-polystyrene-based multiblock copolymer having a uniform structure and showing excellent physical properties through continuous type coordination polymerization and batch type anionic polymerization.

BACKGROUND ART

Block copolymers are materials widely used in even high-tech devices as well as typical plastics, and research and development thereon is being actively conducted. Particularly, styrene-olefin copolymer resins including both a polyolefin-based (POs) block and a polystyrene-based (PSs) block have excellent properties of heat resistance, light resistance, elasticity, or the like, and are usefully used in wide variety of technical fields.

A market of a hundreds of thousands of tons scale is now formed in the world on polyolefin-polystyrene block copolymers, for example, styrene-ethylene-butylene-styrene (SEBS) or styrene-ethylene-propylene-styrene (SEPS). Typically, a polystyrene-block-poly(ethylene-co-1-butene)-block polystyrene (SEBS) triblock copolymer may be exemplified as one of the styrene-olefin copolymer resins. A hard polystyrene domain is separated from a soft poly(ethylene-co-1-butene) matrix in the structure of the SEBS triblock copolymer and acts as a physical crosslinking site, and thermoplastic elastomer properties are shown. According to such properties, SEBS is more broadly used in a product group requiring rubber and plastic, and according to the expansion of a using range, there is a significant increase in demand.

The conventional SEBS was prepared through the reaction of two steps including anionic polymerization of styrene and butadiene and hydrogenation reaction of SBS obtained thereby. The conventional SEPS also was prepared through the reaction of two steps including anionic polymerization of styrene and isoprene and hydrogenation reaction of SIS obtained thereby. The cost of a process of saturating all double bonds included in a polymer main chain by the hydrogenation reaction as described above is high, and the unit cost of SEBS and SEPS increases significantly when compared to SBS and SIS before the hydrogenation reaction, and thus, these points may act as a limit to market expansion. In addition, through the hydrogenation reaction, the saturation of all double bonds in the polymer chain is virtually impossible, and commercialized SEBS and SEPS include some residual double bonds, and the presence thereof often induces a problem.

Accordingly, in order to prepare a block copolymer which accomplishes the thermoplastic elastomer properties and is industrially useful by having a multiblock structure of triblock or higher, a technique of preparing a polyolefin-polystyrene diblock copolymer through a one-pot process from an olefin-based monomer and a styrene monomer, by performing coordination polymerization of an olefin-based monomer to form a polyolefin block, and then, performing anionic polymerization with a styrene monomer to form a polyolefin-polystyrene-based multiblock, has been developed.

However, if the coordination polymerization and the anionic polymerization are performed in batch types, the heat removal of a batch type reactor is difficult, and the recycling for reuse of reactants such as an unreacted monomer is difficult, and operation costs may increase uneconomically. In addition, the control of the concentration of the reactants in a reactor uniform is limited, and there are problems in that the physical properties of a polyolefin-polystyrene-based multiblock copolymer are deteriorated and become non-uniform, and these come to the fore as another tasks.

PRIOR ART DOCUMENT

Patent Document

Korean Registration Patent No. 10-1657925

DISCLOSURE OF THE INVENTION

Technical Problem

An object of the present invention is to provide a method for preparing a polyolefin-polystyrene-based multiblock copolymer having a uniform structure and showing excellent physical properties by performing continuous type coordination polymerization of an olefin-based monomer and batch type anionic polymerization of a styrene-based monomer in order.

Technical Solution

In order to solve the above-described tasks, the present invention provides a method for preparing a polyolefin-polystyrene-based multiblock copolymer, the method comprising: (S1) preparing a polyolefin by performing coordination polymerization of ethylene and an alpha-olefin-based monomer, while continuously injecting a hafnium compound, an organozinc compound, an organic solvent, an ethylene gas and an alpha-olefin-based monomer to a continuous type reactor, and transporting the polyolefin to a batch type reactor; and (S2) performing anionic polymerization of the polyolefin and a styrene-based monomer in the presence of an alkyllithium compound, in the batch type reactor.

Advantageous Effects

The polyolefin-polystyrene-based multiblock copolymer of the present invention may be prepared in a large quantity with excellent productivity by propagating a polyolefin chain through the continuous type polymerization of ethylene and an alpha-olefin-based monomer and then, performing batch type polymerization with a styrene-based monomer, and may reduce manufacturing costs in contrast to the conventional technique to increase economic feasibility and commercial usefulness. In addition, the polyolefin-polystyrene-based multiblock copolymer prepared therefrom shows improved physical properties and may be usefully used in various industrial fields.

MODE FOR CARRYING OUT THE INVENTION

Figure 1:
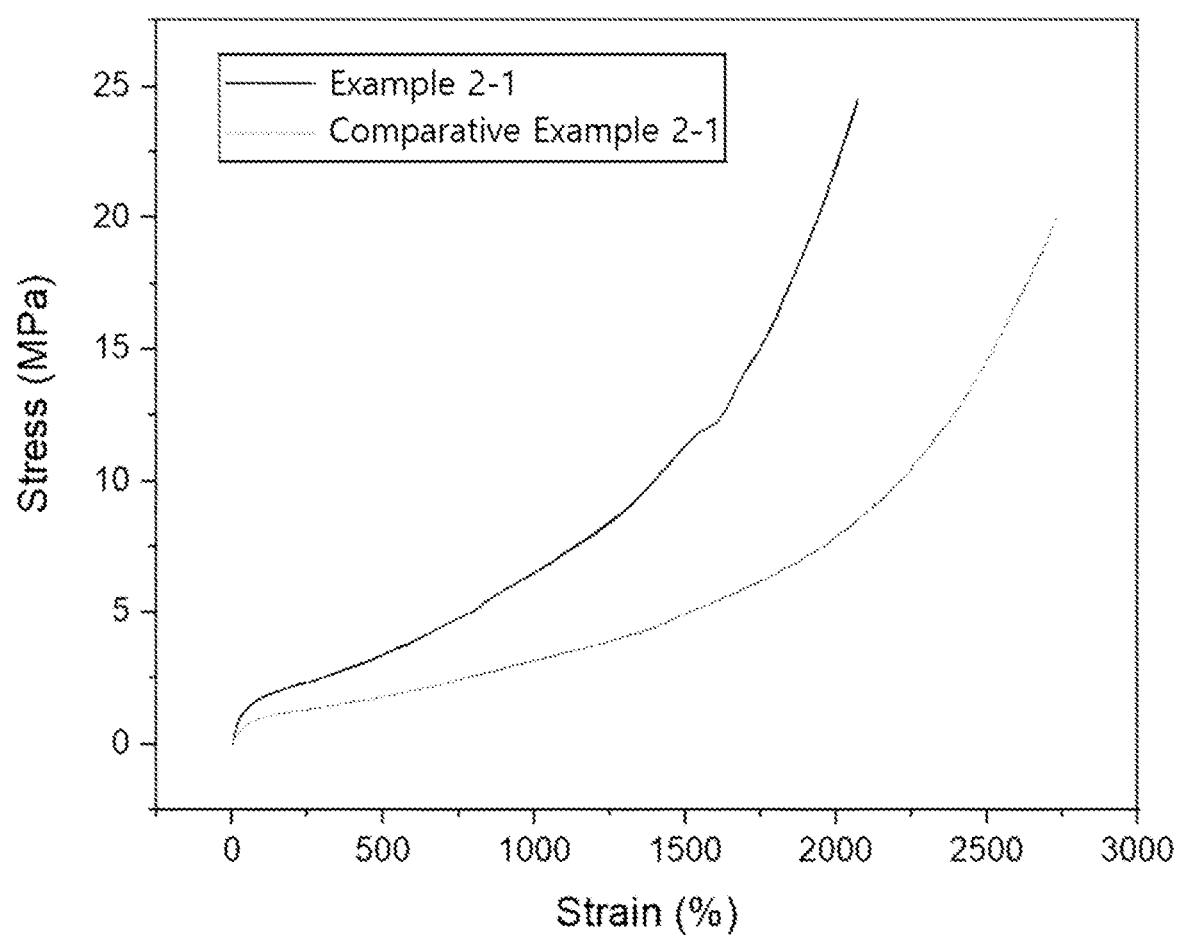
FIG. 1 shows stress-strain curves of polyolefin-polystyrene-based multiblock copolymers according to Example 2-1 of the present invention and Comparative Example 2-1.

Hereinafter, the present invention will be described in more detail to assist the understanding of the present invention.

It will be understood that words or terms used in the description and claims of the present invention shall not be interpreted as the meaning defined in commonly used dictionaries. It will be understood that the words or terms should be interpreted as having a meaning that is consistent with their meaning in the technical idea of the invention, based on the principle that an inventor may properly define the meaning of the words to best explain the invention.

In the present invention, in the case of preparing a polyolefin-polystyrene-based multiblock copolymer through coordination polymerization of ethylene and an alpha-olefin monomer and anionic polymerization with a styrene-based monomer, in order to solve the reduction of the productivity of a polyolefin block and the deterioration of the physical properties of the polyolefin-polystyrene-based multiblock copolymer in the case of performing coordination polymerization in a batch type, the coordination polymerization of the olefin-based monomer is performed by continuous type polymerization. Particularly, an olefin-based monomer is coordination polymerized in a continuous type reactor to form a polyolefin block, and then, the polyolefin block is transported to a batch type reactor, and anionic polymerization with a styrene-based monomer is performed therein.

In addition, in order to increase the efficiency of continuous type coordination polymerization reaction and further improve the physical properties of a copolymer finally prepared, the injection flow rate of a hafnium compound, an organic solvent, an ethylene gas, and an alpha-olefin-based monomer to a continuous type reactor and coordination polymerization time were controlled.

Particularly, the method of the present invention comprises: (S1) preparing a polyolefin by performing coordination polymerization of ethylene and an alpha-olefin-based monomer, while continuously injecting a hafnium compound, an organozinc compound, an organic solvent, an ethylene gas and an alpha-olefin-based monomer to a continuous type reactor, and transporting the polyolefin to a batch type reactor; and (S2) performing anionic polymerization of the polyolefin and a styrene-based monomer in the presence of an alkyllithium compound, in the batch type reactor.

Through such a preparation method, a polyolefin-polystyrene-based multiblock copolymer may be prepared by forming a target polyolefin chain using an organozinc compound which is a chain transfer agent from an olefin-based monomer, and then, forming a polystyrene block at the terminal of the polyolefin chain by performing anionic polymerization with a styrene-based monomer. Particularly, by applying continuous type polymerization and batch type polymerization together, the achievement of the thermoplastic elastomer properties of a copolymer may be increased further, and a copolymer having excellent physical properties such as tensile properties may be obtained.

Step (S1)

This is a step of preparing a polyolefin by performing coordination polymerization of ethylene and an alpha-olefin-based monomer, while continuously injecting a hafnium compound, an organozinc compound, an organic solvent, an ethylene gas and an alpha-olefin-based monomer to a continuous type reactor, and transporting the polyolefin to a batch type reactor.

In this case, the injection flow rate of the hafnium compound may be 0.16 to 1.5 μmol/min, the injection flow rate of the organic solvent is 6 to 48 mL/min, the injection flow rate of the ethylene gas under conditions of 20° C. and 1 bar is 60 to 50,000 cc/min, and the injection flow rate of the alpha-olefin-based monomer is 5 to 15 mL/min per 1 L of the volume of the continuous type reactor.

The continuous type reactor represents a reactor for continuously injecting raw materials used for the reaction, performing the reaction, and continuously discharging a product polymerized and produced, and the continuous type reactor may be, for example, a continuous stirred tank reactor (CSTR) (solution and slurry).

In the preparation method of the present invention, the coordination polymerization of an olefin-based monomer, which is performed as a pre-step during preparing a polyolefin-polystyrene-based multiblock copolymer, is performed in the continuous type reactor, and excellent effects may be achieved in respect of the physical properties of a copolymer in contrast to the conventional method in which the coordination polymerization of an olefin-based monomer is performed by a batch type. Particularly, in the case of polymerizing an olefin-based monomer by a batch type for preparing a polyolefin first for preparing the multiblock copolymer, a semi-batch type may be performed, and this is a single injection type by which total alpha-olefin-based monomer is injected at the initiation point of polymerization reaction, and according to the progress of polymerization, the concentration of an olefin-based monomer in the reactor may decrease gradually. Accordingly, in the same polymer chain, the content of the olefin-based monomer may decrease gradually according to the lapse of time, and there are problems in that a chain arrangement may become non-uniform, and the physical properties of a polymer may not be controlled. In addition, if the coordination polymerization of an olefin-based monomer is performed by a batch type, it would be very influential by parameters including the injection point of a catalyst, an injection rate of an olefin-based monomer, or the like, a polymerization rate is fast, a calorific value is high, and there are problems in that the control of the physical properties of a polyolefin may be difficult, reproducibility may be degraded, and mass production and commercial application may be difficult.

On the contrary, in the preparation method of the present invention, coordination polymerization is performed in a continuous type reactor, and through this, a reaction mixture may be uniformly mixed, and the concentration of a monomer may be kept to a constant level during performing coordination polymerization reaction, and accordingly, problems of changing the physical properties of a polymer including the changing of the alpha-olefin-based monomer content in a polyolefin chain may be prevented, the arrangement of the alpha-olefin-based monomer may become random to improve the attraction among polymer chains, and the improvement of the mechanical properties of a copolymer finally prepared may be expected.

In addition, in respect of productivity, the preparation method of the present invention has advantages in mass production and commercial application by performing the coordination polymerization in a continuous type. Particularly, in the case of batch type polymerization, according to the progress of polymerization, and according to the repeated use of a catalyst initially injected, the activity may be reduced gradually, and the efficiency of polymerization reaction may be lowered. On the contrary, in the case of the continuous type polymerization, a new catalyst is continuously supplied as a reactant, and total catalyst activity of coordination polymerization is shown high, and ethylene and an alpha-olefin-based monomer may be polymerized with high efficiency.

In addition, during polymerizing a polyolefin-polystyrene-based multiblock copolymer by coordinative chain transfer polymerization (CCTP), the polymerization of ethylene and an alpha-olefin-based monomer starts with a hafnium compound and an organozinc compound themselves, without containing a polymer chain. In the beginning of the reaction, the reaction is performed in a mode of unilaterally providing the organozinc compound with a polymer chain grown at the hafnium compound, and after a certain time, efficient CCTP may be performed in a state of containing polymer chains in both the hafnium compound and the organozinc compound. Accordingly, there are problems of requiring an additional certain time before performing full-scale CCTP. In addition, in respect of operating an actual process, the batch type polymerization necessarily requires a washing time after performing a batch. As described above, in the batch type polymerization, a total time taken for processes increases from the time required for practical polymerization due to various factors, to act as a factor of reducing productivity.

On the contrary, in the case of continuous type polymerization, both the hafnium compound and organozinc compound include polymer chains after reaching a stationary state, efficient CCTP may be performed to show excellent productivity, and a polymerization process may be operated without operation stop to show high productivity.

In the present invention, the continuous type reactor may be one and may mean two or more continuous type reactors disposed in series, and in this case, the reactants may be injected into a first reactor among the reactors disposed in series and transported up to a final reactor. After finishing the polymerization, a polyolefin may be discharged and transported to a batch type reactor, which will be explained later.

The hafnium compound may be used in the present invention as long as the hafnium compound may form a polyolefin block through coordination polymerization with an olefin-based monomer, without limitation, and preferably, a homogeneous (metallocene) catalyst including hafnium may be used, and more preferably, a hafnium pyridylamide-based catalyst may be used, without limitation.

By using the hafnium compound, unnecessarily generated β-elimination process may be prevented, uniform polyolefin chains may be efficiently propagated from the organozinc compound to prepare a polyolefin with a high molecular weight, having various block composition, and coordinative chain transfer polymerization (GGTP) may be performed.

The hafnium compound may use an activated one with a co-catalyst compound. In this case, the co-catalyst compound may use a known one in this art, for example, one or more selected from Formula 2 to Formula 4 below.

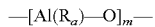 [Formula 2]

 [Formula 3]

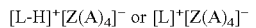 [Formula 4]

In the above formulae,
each $R_a$ is independently a halogen radical; a hydrocarbyl radical of 1 to 20 carbon atoms; or a hydrocarbyl radical of 1 to 20 carbon atoms, which is substituted with halogen,
m is an integer of 2 or more,
D is aluminum or boron,
L is a neutral or cationic Lewis acid,
Z is an element in group 13,
each A is independently aryl of 6 to 20 carbon atoms, in which one or more hydrogen atoms may be substituted with substituents; or alkyl of 1 to 20 carbon atoms, and
the substituent of A is halogen; hydrocarbyl of 1 to 20 carbon atoms; alkoxy of 1 to 20 carbon atoms; or aryloxy of 6 to 20 carbon atoms.

The compound represented by Formula 2 is not specifically limited as long as it is alkylaluminoxane. Preferred embodiments include methylaluminoxane, ethylaluminoxane, isobutylaluminoxane, butylaluminoxane, or the like, and particularly preferable compound is methylaluminoxane.

The compound represented by Formula 3 is not specifically limited but preferred embodiments include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, or the like, and particularly preferred compound is selected from trimethylaluminum, triethylaluminum and triisobutylaluminum.

Examples of the compound represented by Formula 4 includes dioctadecylmethylammonium tetrakis(pentafluorophenyl)borate [$(C_{18}H_{37})_2N(H)Me$]$^+$[$B(C_6F_5)_4$]$^-$, triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl) borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetrapentylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl) aluminum, tributylammonium tetrapentafluorophenylaluminum, N,N-diethylanilinium tetraphenylaluminum, N,N- diethylanilinium tetraphenylaluminum, N,N-diethylanilinium tetrapentafluorophenylaluminum, diethylammonium tetrapentafluorophenylaluminum, triphenylphosphonium tetraphenylaluminum, trimethylphosphonium tetraphenylaluminum, triethylammonium tetraphenylaluminum, tributylammonium tetraphenylaluminum, trimethylammonium tetraphenylborate, tripropylammonium tetraphenylborate, trimethylammonium tetra(p-tolyl)borate, tripropylammonium tetra(p-tolyl)borate, triethylammonium tetra(o,p-dimethylphenyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetraphenylborate, N,N-diethylanilinium tetrapentafluorophenylborate, diethylammonium tetrapetafluorophenylborate, triphenylphosphonium tetraphenylborate, triphenylcarbonium tetra(p-trifluoromethylphenyl)borate, triphenylcarbonium tetrapentafluorophenylborate, or the like.

The hafnium compound may be injected into a continuous type reactor in 0.16 to 1.5 μmol/min per 1 L of the volume of the continuous type reactor. If the hafnium compound is injected in the range, the reactivity of coordination polymerization reaction and the control by reaction heat may be suitably harmonized, the propagation and uniformity of copolymer chains may be secured at the same time, a copolymer having narrow molecular weight distribution may be obtained, and the reproducibility of the reaction may be accomplished. Further, advantages of suppressing the generation of an ultrahigh molecular weight and preventing fouling in the reactor may be expected.

The organozinc compound is used as a chain transfer agent and is a material inducing the preparation of a copolymer by performing chain transfer during the preparation in polymerization reaction, particularly, may be a compound represented by Formula 1 below.

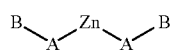

[Formula 1]

In Formula 1,

A is alkylene of 1 to 20 carbon atoms; arylene of 6 to 20 carbon atoms; or arylene of 6 to 20 carbon atoms, which is substituted with halogen, alkyl of 1 to 12 carbon atoms, cycloalkyl of 3 to 12 carbon atoms, alkoxy of 1 to 8 carbon atoms or aryl of 6 to 12 carbon atoms, and B is arylene of 6 to 12 carbon atoms, which is substituted with alkenyl of 2 to 12 carbon atoms.

In addition, A may be alkylene of 1 to 12 carbon atoms; arylene of 6 to 12 carbon atoms; or arylene of 6 to 12 carbon atoms, which is substituted with halogen, alkyl of 1 to 12 carbon atoms, cycloalkyl of 3 to 12 carbon atoms, alkoxy of 1 to 8 carbon atoms or aryl of 6 to 12 carbon atoms, and B may be arylene of 6 to 12 carbon atoms, which is substituted with alkenyl of 2 to 8 carbon atoms.

Formula 1 may have a structure in which both terminals of the formula have double bonds, for example, if B is arylene substituted with alkenyl, the arylene may be connected with A, and the double bond of the alkenyl substituted at the arylene may be positioned at the outermost part in Formula 1.

In the case where the organozinc compound is reacted with one or more olefin-based monomers in the presence of a catalyst composition, polymerization may be performed while the olefin-based monomer is inserted between zinc (Zn) and an organic group (A) of the organozinc compound.

The organozinc compound may be used in an amount of 1 to 200 equivalents based on 1 equivalent of the hafnium compound, and may particularly be used in an amount of 10 to 100 equivalents based on 1 equivalent of the hafnium compound.

The organozinc compound does not include THF and impurities such as a large amount of a magnesium salt and may be served with high purity, and accordingly, may be used as a chain transfer agent and is advantageously used in olefin polymerization.

In addition, a Zn/Hf value which is a molar ratio of a hafnium element in the hafnium compound and a zinc element in the organozinc compound, may be 1 or more, particularly, 100 or more, and 200 or less, or 150 or less. If the Zn/Hf value is 1 or more and 200 or less, the amount of a chain transfer agent in contrast to the hafnium compound is suitable, the use of Zn more than necessary may be prevented to improve economic feasibility, CCTP may be performed efficiently, and the reduction of the molecular weight distribution of a copolymer may be expected.

The organic solvent is injected for performing the coordination polymerization of ethylene and an alpha-olefin monomer in a homogeneous solution state, and may use a hydrocarbon solvent. The hydrocarbon solvent may use an aliphatic hydrocarbon solvent of 4 to 20 carbon atoms, for example, isobutane, hexane, cyclohexane, methylcyclohexane or mixtures thereof, without limitation.

The organic solvent may be injected into a continuous type reactor in 6 to 48 mL/min per 1 L of the volume of the continuous reactor. If the injection flow rate is 6 mL/min or more and 48 mL/min or less, a copolymer produced may be sufficiently dissolved, heat removing effects may be excellent, and the retention time may be secured to secure the sufficient growth of a copolymer.

In the present invention, ethylene and an alpha-olefin-based monomer may be included as the reactants for coordination polymerization. In this case, the ethylene may be injected as a gas.

The alpha-olefin-based monomer may particularly be an aliphatic olefin of 3 to 20 carbon atoms, more particularly, an aliphatic olefin of 4 to 12 carbon atoms, more particularly, an aliphatic olefin of 5 to 12 carbon atoms. As the aliphatic olefin, for example, propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-eicosene, 4,4-dimethyl-1-pentene, 4,4-diethyl-1-hexene, 3,4-dimethyl-1-hexene, or the like, may be used, and any one thereof, or mixtures of two or more thereof may be used.

The ethylene gas may be injected in 60 to 50,000 cc/min per 1 L of the volume of the continuous type reactor under conditions of 20° C. and 1 bar.

In addition, the alpha-olefin-based monomer may be injected in 5 to 15 mL/min per 1 L of the volume of the continuous type reactor.

If the injection flow rate of the alpha-olefin-based monomer is controlled in the aforementioned range, the concentration of the alpha-olefin-based monomer is sufficient in the reactor, an insertion amount into a polymer chain may become excellent, and problems of inhibiting the propagation of a polymer due to the decrease of a retention time may be prevented. In addition, if the flow rate of the alpha-olefin-based monomer and the flow rate of the organic solvent are controlled simultaneously, the concentration of the alpha-olefin-based monomer may be kept to a suitable level in the reactor, a polyolefin with a preferred composition may be obtained, the removal of reaction heat may also be achieved efficiently, and polymerization may be performed stably.

In the coordination polymerization, the retention time of ethylene and an alpha-olefin-based monomer may be within 5 minutes to 2 hours, particularly, 18 minutes or more, 20 minutes or more and 24 minutes or less, 22 minutes or less. With the suitable retention time in the aforementioned range, time for sufficiently dissolving an olefin-based monomer may be secured, and the increase to a super high viscosity of reactants may be secured, thereby serving the increase of productivity and the production of a polyolefin with excellent physical properties.

The temperature of the coordination polymerization may be changed according to the reaction materials and reaction conditions, but may be 70° C. or higher, 90° C. or higher, 110° C. or higher and 170° C. or less, 130° C. or less, 120° C. or less. Within the aforementioned range, a catalyst may be thermally stabilized while increasing the solubility of a polymer.

After transporting the polyolefin thus prepared to a batch type reactor, the polyolefin may play the role of a precursor for preparing a polyolefin-polystyrene-based multiblock copolymer through anionic polymerization reaction, which will be explained later.

Step (S2)

This step is for performing anionic polymerization of the polyolefin and a styrene-based monomer in the presence of an alkyllithium compound, in the batch type reactor, and through the anionic polymerization of the polyolefin chain formed in step (S1) and a styrene-based monomer by a batch type, a polyolefin-polystyrene-based multiblock may be formed.

Particularly, the styrene-based monomer may be continuously inserted between a zinc-carbon bond of (polyolefinyl)$_2$Zn included in the compound formed by step (S1), and at the same time, a styrene group present at the terminal of the compound formed by step (S1) may participate as a copolymerization moiety with the styrene-based monomer to be connected with a polystyrene chain. In addition, a multiblock copolymer formed through the process may be easily quenched through the reaction of a terminal group with water, oxygen or an organic acid, to transform, through this, into an industrially useful polyolefin-polystyrene-based multiblock copolymer.

Different from the continuous type of step (S1), step (S2) is performed by a batch type. In the case of anionic polymerization, the control of the size of a block is the key point during synthesizing a multiblock copolymer, and the anionic polymerization is performed through living polymerization, and accordingly, the polymerization is performed until total styrene-based monomer is consumed. Accordingly, the reduction of the concentration of the reactant, generated during the batch type polymerization may not influence the size control of the block, the polymerization may be performed until a polymerization conversion ratio reached maximum 100%, and by controlling the injection amount of the styrene-based monomer, the size of the block may be controlled.

On the contrary, if the anionic polymerization of step (S2) is performed by a continuous type, the polymerization conversion ratio may not be increased to maximum 100% in the anionic polymerization like the batch type polymerization, there is the distribution of a retention time, and it is difficult to control the size of the block by the injection amount of the monomer, and thus, there are defects of difficult control of the size of the block of a copolymer. In addition, since an initiation time using an anionic polymerization initiator is additionally consumed in the anionic polymerization, and if operated by a continuous type, additional retention time is required to be secured for the uniform initiation of the polymerization reaction at all reaction sites.

Important features of anionic polymerization is the control of the molecular weight distribution of a polymer narrow, and this may be suitably accomplished through a batch type reactor without retention time distribution. On the contrary, if the continuous type reactor is used, there is inherently the retention time distribution of a product, and this increases the molecular weight distribution of a polymer to adversely influence the physical properties of the polymer. Meanwhile, in order to improve polymer productivity in a commercial reactor, anionic polymerization is sometimes performed in a continuous type reactor, but if the retention time is not long, the application is extremely limited. In the preparation method of the polyolefin-polystyrene-based multiblock copolymer of the present invention, the anionic polymerization may require a long polymerization time, and if the continuous type reactor is used, there may be defects of significantly increasing the volume of a reactor or increasing the number of the reactors to satisfy the long retention time.

Considering the points, in the present invention, in the case of preparing a polyolefin-polystyrene multiblock copolymer using CCTP by performing coordination polymerization of ethylene and an alpha-olefin-based monomer and subsequent anionic polymerization of a styrene-based monomer, the coordination polymerization is performed by a continuous type, and the anionic polymerization is performed by a batch type, thereby accomplishing both the control of the physical properties of a copolymer and the improvement of productivity.

In the present invention, the batch type reactors in step (S2) may be connected in parallel to one continuous type reactor of step (S1). After performing the continuous type polymerization with the continuous injection of the reactants for the continuous type coordination polymerization, in order to transport the resultant product to the batch type reactor and perform a next step, the injection inlet of the batch type reactor is blocked to prevent the continuous transportation of the polyolefin from the continuous type reactor. In this case, since the polyolefin is produced continuously in the continuous type reactor, the discard of the polyolefin may be prevented by transporting thereof to another batch type reactor.

The alkyllithium compound is a material widely used as an initiator of anionic polymerization, and a triamine compound has excellent coordination capacity toward lithium, and may be used for the purpose of improving reactivity in the case where an alkyllithium compound is reacted as a base or a nucleophile.

That is, in the present invention, the alkyllithium compound may be used as an initiator through the complex action with the triamine compound. Through this, the production of the polyolefin-polystyrene-based multiblock copolymer which is the target of the present invention may be maximized, while suppressing the production amounts of a polystyrene homopolymer, a polyolefin homopolymer, and a polyolefin-polystyrene diblock copolymer, which may be produced by the use of the conventional initiator.

The alkyllithium compound may be a compound represented by Formula 5 below.

[Formula 5]

$$\underset{\text{Li (A)}}{\diagup\!\!\!\diagdown}\diagdown R_1$$

In Formula 5,
$R_1$ is a hydrocarbon group of 1 to 20 carbon atoms, and
A is represented by Formula 6 below.

[Formula 6]

$$R_2\diagdown\underset{R_3}{N}-\left(\underset{R_4\ R_5}{\phantom{N}}\right)_a-\left(\underset{\phantom{N}}{\overset{R_6}{N}}\right)_b-\left(\underset{R_5\ R_4}{\phantom{N}}\right)_a-\underset{R_3}{N}\diagup R_2$$

in Formula 6,
$R_2$ to $R_6$ are each independently a hydrocarbon group of 1 to 20 carbon atoms, and
a and b are each independently an integer of 0 to 3.
$R_1$ may be hydrogen, alkyl of 1 to 20 carbon atoms, cycloalkyl of 3 to 20 carbon atoms, or substituted or unsubstituted arylalkyl of 7 to 20 carbon atoms;
$R_2$ to $R_6$ may be each independently alkyl of 1 to 20 carbon atoms, alkenyl of 1 to 20 carbon atoms, cycloalkyl of 3 to 20 carbon atoms, substituted or unsubstituted aryl of 6 to 20 carbon atoms, or substituted or unsubstituted arylalkyl of 7 to 20 carbon atoms; and
a and b may be each independently an integer of 0 to 2.
$R_1$ to $R_6$ may be each independently hydrogen or alkyl of 1 to 20 carbon atoms; and a may be 1 or 2, and b may be 0 or 1.
a and b may not be 0 simultaneously, particularly, a may be an integer of 1 to 3, and b may be an integer of 0 to 3, more particularly, a may be 1 or 2, and b may be an integer of 0 to 2, more particularly, a may be 1 or 2, and b may be 0 or 1.
In Formula 5, A may particularly be represented by Formula 6a or Formula 6b below.

[Formula 6a]

$$R_2\diagdown\underset{R_3}{N}\diagdown\diagup\underset{R_3}{\overset{R_2}{N}}\diagdown R_3$$

[Formula 6b]

$$R_2\diagdown\underset{R_3}{N}\diagdown\diagup\underset{\overset{R_6}{N}}{\phantom{N}}\diagdown\diagup\underset{R_3}{\overset{\phantom{N}}{N}}\diagdown R_2$$

In the above formulae,
$R_2$, $R_3$ and $R_6$ are each independently hydrogen or alkyl of 1 to 20 carbon atoms.
In addition, in an embodiment of the present invention, A in Formula 1 may particularly be represented by Formula 6a-1 or 6b-1 below.

[Formula 6a-1]

$$\diagdown\underset{\diagup}{N}\diagdown\diagup\underset{\diagdown}{N}\diagup$$

[Formula 6b-1]

$$\diagdown\underset{\diagup}{N}\diagdown\diagup\underset{\diagdown}{\overset{\diagdown N\diagup}{N}}\diagdown\diagup\underset{\diagdown}{N}\diagup$$

The anionic polymerization initiator according to an embodiment of the present invention is an anionic polymerization agent for polymerizing the polystyrene block of the polyolefin-polystyrene block copolymer, and may be used as an anionic polymerization initiator for forming a polyolefin-polystyrene block copolymer through the reaction with a polyolefin zinc compound, for example, (polyolefinyl)$_2$Zn.

The (polyolefinyl)$_2$Zn is prepared through coordinative chain transfer polymerization (CCTP), and the additional propagation of a polymer chain, initiated from the (polyolefinyl)$_2$Zn may be usefully used for the synthesis of a polyolefin (PO)-based block copolymer. For example, the synthesis of a polyethylene-block-polyester and a polyethylene-block-polyether was tried using PO functionalized with a —OH terminal group, and this could be produced by treating a CCTP product, (polyolefinyl)$_2$Zn with $O_2$. In the same manner, by enabling the synthesis of a polystyrene (PS) block from the (polyolefinyl)$_2$Zn through a one-pot process, a polyethylene-block-polystyrene block copolymer could be prepared, and by polymerizing a styrene monomer in the presence of the (polyolefinyl)$_2$Zn using an anionic polymerization initiator of the present invention, a PS chain could be efficiently propagated from the (polyolefinyl)$_2$Zn.

In addition, the present invention provides an anionic polymerization initiator composition including a compound represented by Formula 6 below and a compound represented by Formula 7 below.

[Formula 6]

$$R_2\diagdown\underset{R_3}{N}-\left(\underset{R_4\ R_5}{\phantom{N}}\right)_a-\left(\underset{\phantom{N}}{\overset{R_6}{N}}\right)_b-\left(\underset{R_5\ R_4}{\phantom{N}}\right)_a-\underset{R_3}{N}\diagup R_2$$

[Formula 7]

B—Li

In Formula 6,
$R_2$ to $R_6$ are each independently a hydrocarbon group of 1 to 20 carbon atoms, and
a and b are each independently an integer of 0 to 3, and
in Formula 7,
B is alkyl of 1 to 20 carbon atoms.
In an embodiment of the present invention, $R_2$ to $R_6$ may be each independently alkyl of 1 to 20 carbon atoms, alkenyl of 1 to 20 carbon atoms, cycloalkyl of 3 to 20 carbon atoms, substituted or unsubstituted aryl of 6 to 20 carbon atoms, or substituted or unsubstituted arylalkyl of 7 to 20 carbon atoms;

B may be alkyl of 1 to 12 carbon atoms; and a and b may be each independently an integer of 0 to 2.

In addition, in an embodiment of the present invention, $R_2$ to $R_6$ may be each independently hydrogen or alkyl of 1 to 20 carbon atoms; B may be alkyl of 1 to 8 carbon atoms; a may be an integer of 1 or 2, and b may be an integer of 0 or 1.

a and b may not be 0 simultaneously, particularly, a may be an integer of 1 to 3, and b may be an integer of 0 to 3, more particularly, a may be 1 or 2, and b may be an integer of 0 to 2, more particularly, a may be 1 or 2, and b may be 0 or 1.

In an embodiment of the present invention, the anionic polymerization initiator composition may additionally include a compound represented by Formula 8 below.

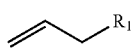

[Formula 8]

$R_1$ is a hydrocarbon group of 1 to 20 carbon atoms.

The anionic polymerization initiator composition may not include a separate compound which may be a solvent in addition to the compound represented by Formula 6, the compound represented by Formula 7 and the additional compound represented by Formula 8, or may include in a small amount not allowing significant reaction with the compound of Formula 7.

If the anionic polymerization initiator composition including the compound represented by Formula 6 and the compound represented by Formula 7 is injected as an anionic polymerization initiator, a structure like Formula 5 may be formed, which may act as an anionic polymerization initiator.

In addition, the anionic polymerization initiator of the present invention includes a reacting process by injecting a compound represented by Formula 6 below, a compound represented by Formula 7 below in the presence of a compound represented by Formula 8 below.

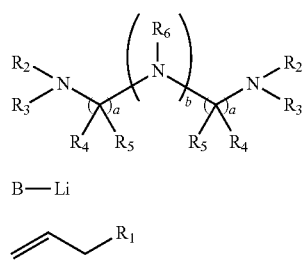

[Formula 6]

[Formula 7]

[Formula 8]

In the above formulae, $R_1$ to $R_6$ are each independently a hydrocarbon group of 1 to 20 carbon atoms;

a and b are each independently an integer of 0 to 3; and

B is alkyl of 1 to 20 carbon atoms.

In an embodiment of the present invention, $R_2$ to $R_6$ may be each independently alkyl of 1 to 20 carbon atoms, alkenyl of 1 to 20 carbon atoms, cycloalkyl of 3 to 20 carbon atoms, substituted or unsubstituted aryl of 6 to 20 carbon atoms, or substituted or unsubstituted arylalkyl of 7 to 20 carbon atoms; a and b may be each independently an integer of 0 to 2; and B may be alkyl of 1 to 12 carbon atoms.

In addition, in an embodiment of the present invention, $R_2$ to $R_6$ may be each independently hydrogen or alkyl of 1 to 20 carbon atoms; a may be an integer of 1 or 2, and b may be an integer of 0 or 1; and B may be alkyl of 1 to 8 carbon atoms.

a and b may not be 0 simultaneously, particularly, a may be an integer of 1 to 3, and b may be an integer of 0 to 3, more particularly, a may be 1 or 2, and b may be an integer of 0 to 2, more particularly, a may be 1 or 2, and b may be 0 or 1.

The alkyllithium compound represented by Formula 7 may be, for example, n-BuLi, and n-BuLi is a material widely used as the initiator of anionic polymerization, is easy to get, and has excellent unit price efficiency.

In the preparation method of an anionic polymerization initiator according to an embodiment of the present invention, a process of reacting the compound represented by Formula 8 and the compound represented by Formula 7 may be performed first, and then, by reacting the compound represented by Formula 6, the compound represented by Formula 5 may be prepared. Particularly, by reacting the compound represented by Formula 8 and the compound represented by Formula 7, an allyllithium is produced as an intermediate, and the allyllithium is reacted with the compound of Formula 6 to finally form the anionic polymerization initiator of Formula 5.

In addition, in the preparation method of the anionic polymerization initiator according to an embodiment of the present invention, a process of reacting by injecting the compound represented by Formula 7 and the compound of Formula 6 in the presence of the compound of Formula 8, may be performed in conditions without an additional solvent. The conditions without an additional solvent means that there is no separate compound which may be a solvent in addition to the compound represented by Formula 7 and the compound represented by Formula 6 in the presence of the compound represented by Formula 8, or there is a small amount not allowing significant reaction with the compound of Formula 7.

If the reaction is performed in conditions without an additional solvent, the reaction of the compound represented by Formula 8 and the compound represented by Formula 7 may be performed as main reaction, and the anionic polymerization initiator of Formula 5 may be effectively prepared. If there is a separate solvent, the anionic polymerization initiator of Formula 5, a compound produced by the reaction of the compound represented by Formula 7 and the compound represented by Formula 6, and a decomposed compound of the compound produced by the reaction of the compound represented by Formula 7 and the compound represented by Formula 6 may be present in a mixed state, and it is not effective.

The anionic polymerization initiator or the anionic polymerization initiator composition of the present invention may be usefully used as an initiator for polymerizing styrene, and may be effectively used as an initiator for propagating a polystyrene chain from the polyolefin of an organozinc compound, particularly, (polyolefinyl)$_2$Zn in which a polyolefin chain is propagated with zinc (Zn) as a center.

The styrene-based monomer may be a styrene-based monomer of 6 to 20 carbon atoms, more particularly, a styrene-based monomer including ethylene in which an aryl group of 6 to 20 carbon atoms is substituted, ethylene in which a phenyl group is substituted, or the like, for example, styrene, α-methyl styrene, α-ethyl styrene, p-methyl styrene or mixtures thereof.

Particularly, the alkyllithium compound and the triamine compound may be mixed with an aliphatic hydrocarbon solvent and injected, or injected to a batch type reactor in order.

The temperature of the anionic polymerization may be changed according to the reaction materials, reaction conditions, or the like, and may particularly, be 40° C. or more, 90° C. or more, and 170° C. or less, 120° C. or less.

The time of the anionic polymerization may be changed according to the reaction materials, reaction conditions, or the like, and may particularly, be 0.5 to 10 hours, 0.5 to 8 hours, 0.5 to 5 hours, or 0.5 to 2 hours. Within the range, it is advantageous to transform the total amount of the styrene-based monomer injected into the multiblock copolymer.

Through the reaction, the polyolefin-polystyrene-based multiblock copolymer may be prepared, and may be, for example, a polystyrene-poly(ethylene-co-propylene)-polystyrene block copolymer, a polystyrene-poly(ethylene-co-1-butene)-polystyrene block copolymer, a polystyrene-poly(ethylene-co-1-pentene)-polystyrene block copolymer, a polystyrene-poly(ethylene-co-1-hexene)-polystyrene block copolymer, a polystyrene-poly(ethylene-co-1-heptene)-polystyrene block copolymer, a polystyrene-poly(ethylene-co-1-octene)-polystyrene block copolymer, or mixtures thereof.

EXAMPLES

Hereinafter, the present invention will be explained in more detail referring to embodiments. However, the embodiments are for illustrating the present invention, and the scope of the present invention is not limited thereto.

1. Preparation of Polyolefin

Example 1-1

To a 0.3 L, continuous stirred tank reactor, while injecting 0.17 mL/min (0.15 μmol/min) of a hafnium compound activated with $[(C_{18}H_{37})_2N(H)Me]^+[B(C_6F_5)_4]^-$ (45.0 μmol) in methylcyclohexane, 0.17 mL/min (23 μmol/min) of an organozinc compound as a chain transfer agent, 6 mL/min of methylcyclohexane (MCH) as an organic solvent, 1500 cc/min of an ethylene gas, and 2.7 mL/min of 1-hexene as an alpha-olefin-based monomer, the pressure and temperature in the reactor was set to 25 bar and 90° C., and polymerization was performed for a retention time of 24 minutes to prepare a polyolefin.

Examples 1-2 to 1-13

Preparation was performed by the same method as Example 1-1 except for changing polymerization conditions in the continuous type reactor as in Table 1 below.

TABLE 1

|  | Hf | | Zr | MCH | | | 1-hexene | | | | | |
| --- | --- | --- | --- | --- | --- | --- | --- | --- | --- | --- | --- | --- |
|  | μmol/min | Per 1 L of reactor volume | (μmol/min) | mL/min | Per 1 L of reactor volume | Ethylene (cc/min) | mL/min | Per 1 L of reactor volume | Temp (° C.) | Pressure (bar) | Time (min) | Zn/Hf |
| Example 1-1 | 0.15 | 0.50 | 23 | 6.0 | 20.00 | 1500 | 2.70 | 9.00 | 90 | 25 | 24 | 153 |
| Example 1-2 | 0.18 | 0.60 | 27 | 4.9 | 16.33 | 1500 | 2.70 | 9.00 | 108 | 25 | 28 | 150 |
| Example 1-3 | 0.16 | 0.53 | 24 | 7.0 | 23.33 | 1500 | 3.15 | 10.50 | 110 | 25 | 21 | 150 |
| Example 1-4 | 0.15 | 0.50 | 15 | 7.9 | 26.33 | 1500 | 1.80 | 6.00 | 120 | 30 | 22 | 100 |
| Example 1-5 | 0.15 | 0.50 | 15 | 7.9 | 26.33 | 5000 | 1.80 | 6.00 | 120 | 30 | 22 | 100 |
| Example 1-6 | 0.12 | 0.40 | 12 | 7.9 | 26.33 | 5000 | 1.80 | 6.00 | 120 | 30 | 22 | 100 |
| Example 1-7 | 0.19 | 0.63 | 19 | 7.9 | 26.33 | 5000 | 2.20 | 7.33 | 110 | 30 | 21 | 100 |
| Example 1-8 | 0.15 | 0.33 | 15 | 7.8 | 26.00 | 5000 | 1.90 | 3.33 | 120 | 30 | 22 | 100 |
| Example 1-9 | 0.07 | 0.23 | 7 | 7.7 | 25.66 | 1500 | 2.00 | 6.66 | 120 | 30 | 22 | 100 |
| Example 1-10 | 0.10 | 0.33 | 10 | 7.7 | 25.66 | 1500 | 2.00 | 6.66 | 120 | 30 | 22 | 100 |
| Example 1-11 | 0.15 | 0.50 | 15 | 7.4 | 24.67 | 5000 | 2.30 | 7.67 | 120 | 30 | 22 | 100 |
| Example 1-12 | 0.15 | 0.50 | 15 | 7.4 | 24.69 | 4000 | 2.60 | 8.67 | 120 | 30 | 21 | 100 |
| Example 1-13 | 0.14 | 0.46 | 21 | 15.4 | 51.33 | 1500 | 3.60 | 12.00 | 120 | 25 | 11 | 150 |

Comparative Example 1-1

In a batch type reactor, both coordination polymerization and anionic polymerization were performed to prepare a polyolefin-polystyrene-based copolymer. Particularly, a parr reactor (1 gallon) was vacuum dried at 120° C. for 2 hours. A solution of $Oc_3Al$ (1466.4 mg, 1000 μmol-Al) in methylcyclohexane (1200 g) was added to the reactor. A mixture was stirred at 120° C. for 1 hour using a heating jacket, and then, a solution was removed using a cannular.

Methylcyclohexane (1170 mL) containing $Oc_3Al$ (1098.3 mg, 749 μmol-Al/25 wt % in hexane) was charged as a scavenger in the reactor, and 1-hexene (639 mL) was charged as an alpha-olefin-based monomer, and the temperature was set to 90° C. A solution of the organozinc compound (1000 μmol) in methylcyclohexane (3.85 g) was charged as a chain transfer agent, and then, a methyl cyclohexane solution (1.68 g) containing a hafnium compound (10.0 μmol-Hf) activated with $[(C_{18}H_{37})_2N(H)Me]^+$ $[B(C_6F_5)_4]^-$ (10.0 μmol) in methylcyclohexane was injected. While keeping the pressure in the reactor to 25 bar by opening the valve of an ethylene tank, polymerization was performed for 40 minutes to prepare a polyolefin.

Comparative Examples 1-2 and 1-3

Preparation was performed by the same method as Comparative Example 1-1 except for changing polymerization conditions in the batch type reactor as in Table 2 below.

TABLE 2

| | Hf (μmol) | Zn (μmol) | MCH (mL) | Ethylene (cc) | 1-hexene (mL) | Temp (° C.) | Pressure (bar) | Time (min) | Zn/Hf |
|---|---|---|---|---|---|---|---|---|---|
| Comparative Example 1-1 | 10.0 | 1,000 | 1,170 | 58,000 | 639 | 90 | 25 | 40 | 100 |
| Comparative Example 1-2 | 10.0 | 1,800 | 1,558 | 75,000 | 832 | 117 | 25 | 40 | 180 |
| Comparative Example 1-3 | 12.0 | 2,500 | 1,506 | 51,000 | 892 | 103 | 20 | 40 | 208 |

In the table, the volume of ethylene is based on 20° C. and 1 atm.

2. Preparation of Polyolefin-Polystyrene-Based Multiblock Copolymer

Example 2-1

Anionic polymerization was performed a styrene-based monomer and the polyolefin prepared in Example 1-8 as a reactant in a batch type reactor.

The resultant product including the polyolefin prepared in Example 1-8 was transported to a batch type reactor, and a $Me_3SiCH_2Li$ (PMDETA) solution prepared by mixing $Me_3SiCH_2Li$ (21.7 mg, 0.23 mmol) and PMDETA (43.8 mg, 0.25 mmol) in methylcyclohexane (3.85 g) was injected thereto. After keeping the temperature to 90° C. for 30 minutes while stirring, styrene (7.8 g) was injected. The temperature was controlled in a range of 90-100° C. using a heating jacket.

The viscosity was gradually increased and within 5 hours, reached to an almost invisible state. Through the $^1H$ NMR analysis of an aliquot, the complete conversion of the styrene was confirmed. After the complete conversion of the styrene, 2-ethylhexanoic acid and ethanol were continuously injected. A polymer lump obtained (23 g) was dried overnight in a vacuum oven of 80° C.

Examples 2-2 and 2-3

Polyolefin-polystyrene-based multiblock copolymers were prepared by the same method as Example 2-1 except for applying Example 1-11 and 1-12, respectively, instead of applying the polyolefin of Example 1-8, in Example 2-1.

Comparative Example 2-1

Anionic polymerization was performed with a styrene-based monomer and the polyolefin prepared in Comparative Example 1-1 as a reactant in a batch type reactor.

In a reactor including the polyolefin prepared in Comparative Example 1-1, the temperature was controlled in a range of 90-120° C., and remaining ethylene gas was discharged. If the temperature reached 90° C., a $Me_3SiCH_2Li$ (PMDETA) solution prepared by mixing $Me_3SiCH_2Li$ (81.9 mg, 0.87 mmol) and PMDETA (165.7 mg, 0.957 mmol) in methylcyclohexane (3.85 g) was added. After keeping the temperature to 90° C. for 30 minutes while stirring, styrene (69.0 g) was injected. The temperature was controlled in a range of 90-100° C. using a heating jacket.

The viscosity was gradually increased and within 5 hours, reached to an almost invisible state. Through the $^1H$ NMR analysis of an aliquot, the complete conversion of the styrene was confirmed. After the complete conversion of the styrene, 2-ethylhexanoic acid and ethanol were continuously injected. A polymer lump obtained (132 g) was dried overnight in a vacuum oven of 80° C.

Comparative Examples 2-2 and 2-3

Polyolefin-polystyrene-based multiblock copolymers were prepared by the same method as Comparative Example 2-1 except for applying Comparative Examples 2-2 and 2-3, respectively, instead of applying the polyolefin of Comparative Example 1-1, in Comparative Example 2-1.

Experimental Example 1: Analysis of Polyolefin (1) Measurement of the Contents of Ethylene and Alpha-Olefin Measurement was performed through NMR. $^1H$ NMR was measured under conditions of ns=16, d1=3 s, solvent=TCE-d2, and 373K, using a Bruker 600 MHz AVANCE III HD NMR apparatus, and the solvent peak of TCE-d2 was calibrated to 6.0 ppm. $CH_3$ of 1-propylene was confirmed at 1 ppm, $CH_3$ related peaks (triplet) of a butyl branch by 1-hexene were confirmed at around 0.96 ppm, and the contents were calculated. In addition, the styrene content was calculated by aromatic peaks around 6.5 to 7.5 ppm.

(2) Weight Average Molecular Weight (Mw, g/mol) and Molecular Weight Distribution (Polydispersity Index, PDI)

A weight average molecular weight (Mw, g/mol) and a number average molecular weight (Mn, g/mol) were measured using gel permeation chromatography (GPC), respectively, and molecular weight distribution (polydispersity index, PDI) was calculated by dividing the weight average molecular weight by the number average molecular weight.

Column: PL Olexis
Solvent: trichlorobenzene (TCB)
Flow rate: 1.0 mL/min
Specimen concentration: 1.0 mg/mL
Injection amount: 200 μL
Column temperature: 160° C.
Detector: Agilent High Temperature RI detector
Standard: Polystyrene
Mark-Houwink equation was used (K=40.8×10$^{-5}$, α=0.7057) to calculate the molecular weight by Universal Calibration.

(3) Polyolefin Yield (ton/m³hrmol)

In the cases of Examples 1-1 to 1-13, the amounts of polyolefins discharged from a continuous type reactor through total reaction were measured, and masses in contrast to the volume, time and molar numbers were calculated, and in the cases of Comparative Examples 1-1 to 1-3, the degrees of the yields of the polyolefins were calculated through the yields of the multiblock copolymers prepared in Comparative Examples 2-1 to 2-3, and the mass fractions of C2, 1-C6 measured by $^1$H NMR.

TABLE 3

| | Polyolefin yield (ton/m³hrmol) | Ethylene (wt %) | alpha-olefin (wt %) | Mw (g/mol) | PDI |
|---|---|---|---|---|---|
| Example 1-1 | 17,055 | 59.6 | 40.4 | 48,000 | 2.05 |
| Example 1-2 | 19,098 | 66.9 | 33.1 | 43,000 | 1.97 |
| Example 1-3 | 17,958 | 60.4 | 39.6 | 53,000 | 2.00 |
| Example 1-4 | 18,485 | 52.9 | 47.1 | 64,000 | 2.18 |
| Example 1-5 | 24,503 | 62.3 | 37.7 | 80,000 | 2.07 |
| Example 1-6 | 24,553 | 78.9 | 21.1 | 85,000 | 2.14 |
| Example 1-7 | 24,514 | 62.9 | 37.1 | 62,000 | 1.95 |
| Example 1-8 | 24,750 | 67.0 | 33.0 | 90,000 | 2.16 |
| Example 1-9 | 17,738 | 66.0 | 34.0 | 73,000 | 3.11 |
| Example 1-10 | 18,071 | 62.0 | 38.0 | 126,000 | 2.42 |
| Example 1-11 | 22,917 | 58.2 | 41.8 | 91,000 | 2.11 |
| Example 1-12 | 21,489 | 55.6 | 44.4 | 82,000 | 2.06 |
| Example 1-13 | 17,811 | 67.3 | 32.7 | 29,000 | 3.36 |
| Comparative Example 1-1 | 5,086 | 61.9 | 38.1 | 82,000 | 2.18 |
| Comparative Example 1-2 | 8,750 | 59.5 | 40.5 | 93,000 | 2.13 |
| Comparative Example 1-3 | 11,185 | 55.0 | 45.0 | 96,000 | 2.05 |

In the case of Comparative Example 1-1, the coordination polymerization of ethylene and an alpha-olefin-based monomer was performed in a batch type reactor, and the yield of the polyolefin was 5,086 ton/m³·hr·mol, which was markedly lower in contrast to the Examples and Comparative Examples, in which the coordination polymerization was performed by continuous type reaction. Meanwhile, in the case of Example 1-13, the results were obtained by changing specific conditions including the injection amount of the solvent, or the like among the reaction conditions, and it could be confirmed from the data that the molecular weight of the polyolefin was low, and the molecular weight distribution was broad, but the production amount was significantly excellent when compared to Comparative Examples 1-1 to 1-3.

Experimental Example 2: Analysis of Polyolefin-Polystyrene-Based Multiblock Copolymer With respect to the polyolefin-polystyrene-based multiblock copolymers prepared in the Examples and Comparative Examples, physical properties were measured according to the conditions and methods below, and the results are shown in Tables 4 to 6.

(1) Measurement of the Contents of Ethylene, Alpha-Olefin and Styrene

Measurement was conducted by the same manner as in Experimental Example 1. The content of styrene was calculated using aromatic peaks around 6.5 to 7.5 ppm.

(2) Weight Average Molecular Weight (Mw, g/mol) and Molecular Weight Distribution (Polydispersity Index, PDI)

Measurement was conducted by the same manner as in Experimental Example 1.

(3) Tensile Properties

Figure 2:
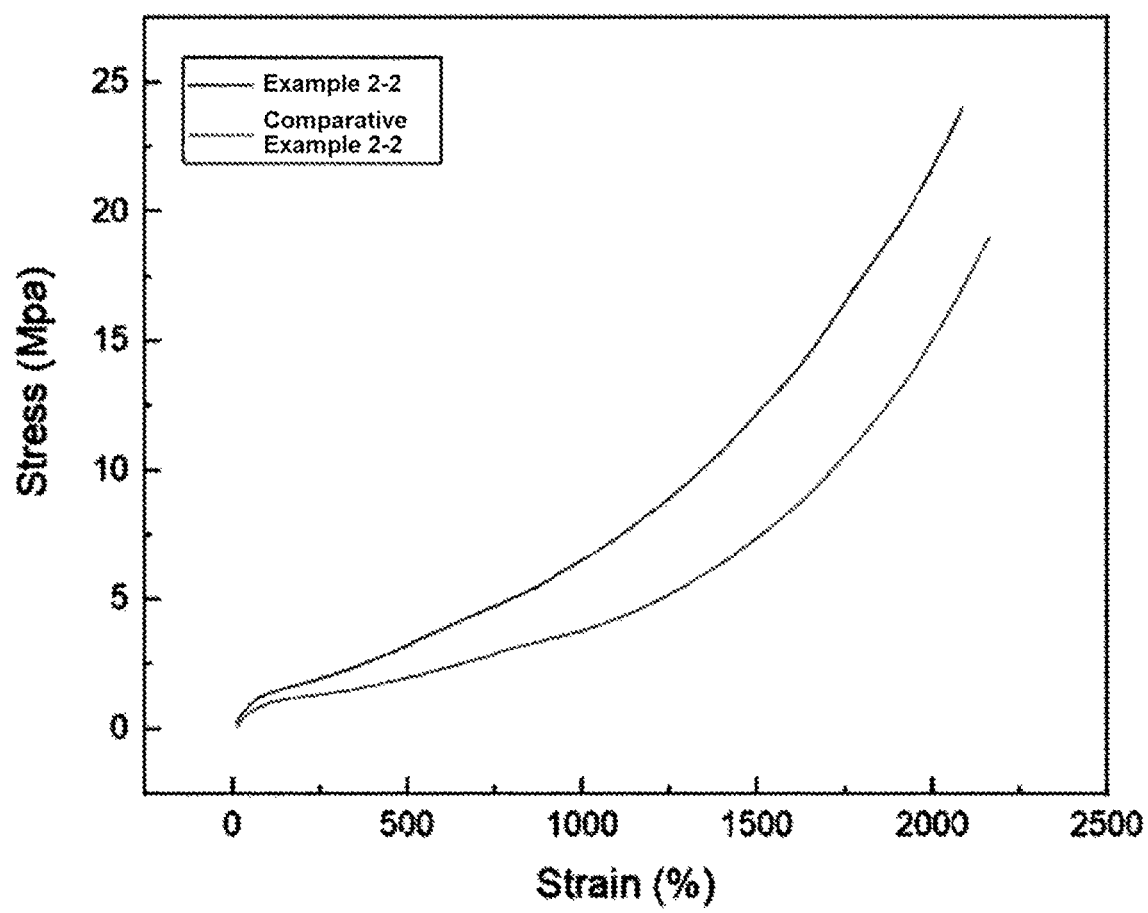
FIG. 2 shows stress-strain curves of polyolefin-polystyrene-based multiblock copolymers according to Example 2-2 of the present invention and Comparative Example 2-2.
Figure 3:
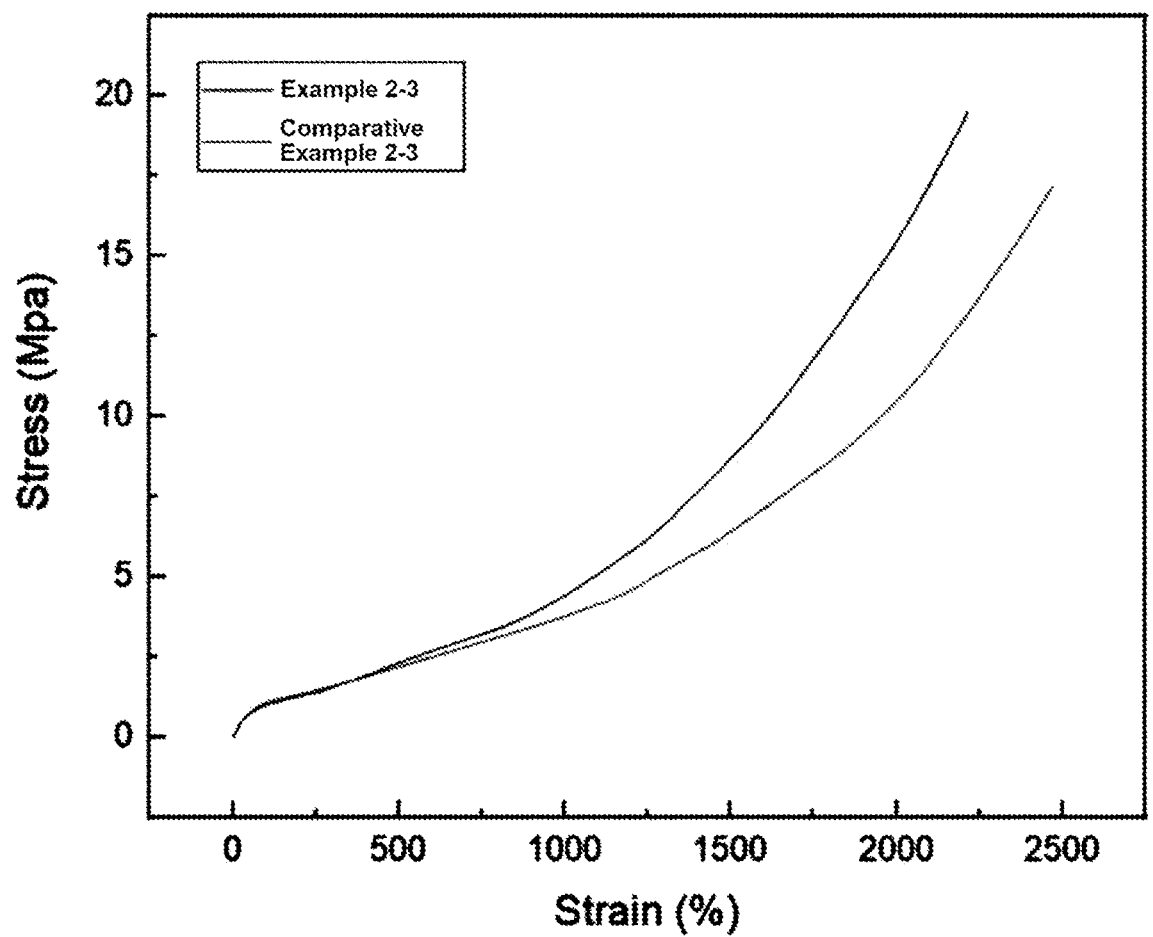
FIG. 3 shows stress-strain curves of polyolefin-polystyrene-based multiblock copolymers according to Example 2-3 of the present invention and Comparative Example 2-3.

Based on a tensile test method of ASTM D412, each specimen was manufactured, tensile strength, elongation, and 300% modulus were measured, and stress-strain curves are shown in FIGS. 1 to 3.

TABLE 4

| | Ethylene (wt %) | Alpha-olefin (wt %) | Styrene (wt %) | Mw (g/mol) | PDI | Tensile strength (MPa) | Elongation (%) | 300% modulus (MPa) |
|---|---|---|---|---|---|---|---|---|
| Example 2-1 | 63.4 | 31.2 | 5.3 | 127,000 | 1.95 | 25.2 | 2,091 | 2.5 |
| Comparative Example 2-1 | 60.1 | 37.0 | 2.9 | 127,000 | 2.13 | 20.8 | 2,756 | 1.4 |

TABLE 5

| | Ethylene (wt %) | Alpha-olefin (wt %) | Styrene (wt %) | Mw (g/mol) | PDI | Tensile strength (MPa) | Elongation (%) | 300% modulus (MPa) |
|---|---|---|---|---|---|---|---|---|
| Example 2-2 | 43.3 | 31.1 | 25.6 | 144,000 | 2.11 | 24.5 | 2,103 | 2.2 |
| Comparative Example 2-2 | 44.6 | 30.4 | 25.0 | 146,000 | 1.94 | 19.6 | 2,184 | 1.4 |

TABLE 6

| | Ethylene (wt %) | Alpha-olefin (wt %) | Styrene (wt %) | Mw (g/mol) | PDI | Tensile strength (MPa) | Elongation (%) | 300% modulus (MPa) |
|---|---|---|---|---|---|---|---|---|
| Example 2-3 | 45.5 | 36.4 | 18.0 | 146,000 | 2.06 | 19.9 | 2,234 | 1.6 |
| Comparative Example 2-3 | 45.4 | 37.1 | 17.5 | 147,000 | 1.89 | 16.7 | 1,931 | 1.4 |

As shown in Tables 4 to 6, in the cases of Comparative Examples 2-1 to 2-3, in which all polymerization processes were performed in batch type reactors, the tensile properties were inferior to those of corresponding Examples 2-1 to 2-3, respectively, and the results may be negative evidence of the non-uniform arrangement of monomers in a polymer chain, and structurally, the distribution of tensile properties in the polymer chain could not be effectively induced.

The difference of the physical properties of the polymers according to the polymerization process may be clearly confirmed through FIGS. 1 to 3. Referring to FIGS. 1 to 3, it could be confirmed that the polyolefin-polystyrene-based multiblock copolymers of Examples 2-1 to 2-3 showed very high tensile strength when compared to the polyolefin-polystyrene-based multiblock copolymers of Comparative Examples 2-1 to 2-3, and it could be confirmed that very high tensile strength was shown even with the low styrene content as in Example 2-1. Such results are thought to be shown because if the polymerization is performed by continuous type polymerization even for polyolefins having similar molecular weights and compositions, effects by the arrangement of monomers in a polymer chain may be maximized in contrast to batch type polymerization, and even better effects could be shown.

In addition, it could be confirmed that the tensile strength and elongation could be controlled according to the control of the contents of the alpha-olefin and the styrene through Examples 2-1 to 2-3.

The invention claimed is:

1. A method for preparing a polyolefin-polystyrene-based multiblock copolymer, the method comprising:
   (S1) preparing a polyolefin by performing coordination polymerization of ethylene and an alpha-olefin-based monomer, while continuously injecting a hafnium compound, an organozinc compound, an organic solvent, an ethylene gas and an alpha-olefin-based monomer to a continuous type reactor, and transporting the polyolefin to a batch type reactor; and
   (S2) performing anionic polymerization of the polyolefin and a styrene-based monomer in the presence of an alkyllithium compound, in the batch type reactor.

2. The method for preparing a polyolefin-polystyrene-based multiblock copolymer according to claim 1, wherein an injection flow rate of the organic solvent is 6 to 48 mL/min per 1 L of the volume of the continuous type reactor.

3. The method for preparing a polyolefin-polystyrene-based multiblock copolymer according to claim 1, wherein a Zn/Hf value which is a molar ratio of a hafnium element in the hafnium compound and a zinc element in the organozinc compound, is 1 or more.

4. The method for preparing a polyolefin-polystyrene-based multiblock copolymer according to claim 1, wherein the organozinc compound is a compound represented by the following Formula 1:

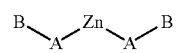

[Formula 1]

in Formula 1,

A is alkylene of 1 to 20 carbon atoms; arylene of 6 to 20 carbon atoms; or arylene of 6 to 20 carbon atoms, which is substituted with halogen, alkyl of 1 to 12 carbon atoms, cycloalkyl of 3 to 12 carbon atoms, alkoxy of 1 to 8 carbon atoms or aryl of 6 to 12 carbon atoms, and B is arylene of 6 to 12 carbon atoms, which is substituted with alkenyl of 2 to 12 carbon atoms.

5. The method for preparing a polyolefin-polystyrene-based multiblock copolymer according to claim 1, wherein the organic solvent is one or more selected from the group consisting of methylcyclohexane, isobutane, hexane and cyclohexane.

6. The method for preparing a polyolefin-polystyrene-based multiblock copolymer according to claim 1, wherein the alpha-olefin-based monomer is one or more selected from the group consisting of propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-eicosene, 4,4-dimethyl-1-pentene, 4,4-diethyl-1-hexene and 3,4-dimethyl-1-hexene.

7. The method for preparing a polyolefin-polystyrene-based multiblock copolymer according to claim 1, wherein the alkyllithium compound is a compound represented by the following Formula 5:

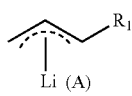

[Formula 5]

in Formula 5,
$R_1$ is a hydrocarbon group of 1 to 20 carbon atoms, and
A is represented by the following Formula 6:

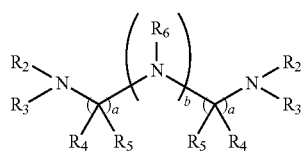

[Formula 6]

in Formula 6,
$R_2$ to $R_6$ are each independently a hydrocarbon group of 1 to 20 carbon atoms, and
a and b are each independently an integer of 0 to 3.

8. The method for preparing a polyolefin-polystyrene-based multiblock copolymer according to claim 1, wherein the styrene-based monomer is one or more selected from the group consisting of styrene, α-methyl styrene, α-ethyl styrene and p-methyl styrene.

9. The method for preparing a polyolefin-polystyrene-based multiblock copolymer according to claim 1, wherein the coordination polymerization is performed at a temperature of 70 to 170° C.

10. The method for preparing a polyolefin-polystyrene-based multiblock copolymer according to claim 1, wherein the anionic polymerization is performed at a temperature of 40 to 170° C. for 0.5 to 10 hours.

11. The method for preparing a polyolefin-polystyrene-based multiblock copolymer according to claim 1, wherein an injection flow rate of the hafnium compound is 0.16 to 1.5 μmol/min, an injection flow rate of the ethylene gas under conditions of 20° C. and 1 bar is 60 to 50,000 cc/min, and an injection flow rate of the alpha-olefin-based monomer is 5 to 15 mL/min per 1 L of the volume of the continuous type reactor.

12. The method for preparing a polyolefin-polystyrene-based multiblock copolymer according to claim 4, wherein the arylene of B is connected with A in Formula 1.

13. The method for preparing a polyolefin-polystyrene-based multiblock copolymer according to claim 7, wherein A is represented by the following Formula 6a or Formula 6b:

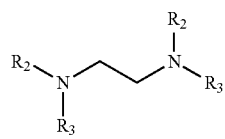

[Formula 6a]

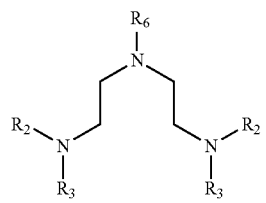

[Formula 6b]

in the above formulae,
$R_2$, $R_3$ and $R_6$ are each independently hydrogen or alkyl of 1 to 20 carbon atoms.

* * * * *